United States Patent [19]
Blanc

[11] Patent Number: 5,626,238
[45] Date of Patent: May 6, 1997

[54] DEVICE FOR CONVEYING PRODUCTS, IN PARTICULAR FRUIT, ADAPTED TO SORT THESE PRODUCTS AS A FUNCTION OF PREDETERMINED SELECTION CRITERIA

[75] Inventor: Philippe Blanc, Montauban, France

[73] Assignee: Materiel Pour L'ArboricultureFruitiere (Societe Anonyme), Montauban, France

[21] Appl. No.: 397,977

[22] Filed: Mar. 3, 1995

[30] Foreign Application Priority Data

Mar. 3, 1994 [FR] France .................. 94 02675

[51] Int. Cl.⁶ .................................................. B07C 5/24
[52] U.S. Cl. ...................... 209/646; 209/912; 198/370.04
[58] Field of Search ........................ 209/646, 648, 209/912, 592, 645, 649, 580, 577, 578, 538, 545, 698, 701, 707; 198/890, 890.1, 370.01, 370.04, 534, 464.2

[56] References Cited

U.S. PATENT DOCUMENTS

| | | | |
|---|---|---|---|
| 2,980,252 | 4/1961 | Bray et al. | 209/646 |
| 3,372,804 | 3/1968 | Puoti | 209/646 |
| 3,637,066 | 1/1972 | Idskov et al. | 198/370.04 X |
| 4,254,877 | 3/1981 | Rose | 209/912 X |
| 4,411,366 | 10/1983 | De Greef | 209/646 X |
| 4,830,195 | 5/1989 | De Greef | |
| 5,022,532 | 6/1991 | D'Urso | 209/912 X |
| 5,197,585 | 3/1993 | Blood | |
| 5,267,654 | 12/1993 | Leverett | 209/912 X |
| 5,280,838 | 1/1994 | Blanc | 209/912 X |
| 5,294,004 | 3/1994 | Leverett | 198/370.04 X |
| 5,306,877 | 4/1994 | Tas | 209/912 X |
| 5,307,921 | 5/1994 | Richardson | 198/370.04 |

FOREIGN PATENT DOCUMENTS

| | | |
|---|---|---|
| 0283388 | 9/1988 | European Pat. Off. |
| 0540126 | 5/1993 | European Pat. Off. |

*Primary Examiner*—D. Glenn Dayoan
*Attorney, Agent, or Firm*—Harold H. Dutton, Jr.; Diane F. Liebman

[57] ABSTRACT

The invention relates to a device for conveying products, in particular fruit, including two conveyors extending as an extension of one another and having an intermediate transfer zone in which they are disposed side by side and parallel with respect to one another: a first conveyor provided with rollers (7) defining, in pairs, a housing for a product, and a second conveyor provided with conveyor receptacles (15) mounted to tilt on a support (21), each of these receptacles being adapted to be interposed between two rollers (7) in the transfer zone, in order to support the product initially housed between these rollers (7) after these rollers have been retracted.

18 Claims, 10 Drawing Sheets

DEVICE FOR CONVEYING PRODUCTS, IN PARTICULAR FRUIT, ADAPTED TO SORT THESE PRODUCTS AS A FUNCTION OF PREDETERMINED SELECTION CRITERIA

FIELD OF THE INVENTION

The invention relates to a device for conveying products, in particular fruit, adapted to sort these products as a function of predetermined selection criteria, such as weight, external appearance, etc. This invention relates more particularly to conveyor devices comprising several supports of different types along the conveyor line between which the fruit is transferred.

DESCRIPTION OF RELATED ART

A first type of conveyor device designed in this way is disclosed in particular in U.S. Pat. Nos. 5,197,585 and 4,830,195, and comprises a loading zone for the fruit formed by a conveyor comprising a first type of support, and a second sorting and unloading zone, formed by at least one conveyor comprising a second type of support, these conveyors being disposed as an extension of one another. The main drawback of these conveyor devices lies in the fact that, during the transfer of the fruit between the two conveyors, this fruit falls from a height which, while relatively small, frequently causes bruising of the fruit.

A second type of conveyor device disclosed in particular in Patent EP 540 126 comprises a single conveyor provided with multi-function support means for fruit, comprising support members adapted to be retracted or to support the fruit as a function of the operation being carried out (loading, examination of colour, weighing, unloading, etc.). These devices remedy the above-mentioned drawback as the fruit is not subject to impacts during the relative displacements of the support members. However, they require very complex support means that are therefore relatively costly and relatively fragile. Moreover, the maintenance costs of these conveyors are high as a result, in particular, of their complexity and the number of supports that require regular cleaning so that measurements (weighing, etc.) are not distorted.

The present invention is intended to remedy the above-mentioned drawbacks of known devices and has the main aim of providing a conveyor device provided, on the one hand, with fruit support members of a simple design and, on the other hand, carrying out all the operations of loading, selection, unloading, etc., of the fruit without any risk of bruising of this fruit.

A further object of the invention is to provide a conveyor device able to carry out, in addition to other selection operations, a weight calibration of the fruit.

SUMMARY OF THE INVENTION

For this purpose, the invention relates to a conveyor device comprising in combination:

a first conveyor provided with a loading zone for the products and comprising a plurality of rollers mounted freely to rotate about a shaft borne by an endless chain and extending at right angles with respect to the latter, which rollers are spaced such that two successive rollers define between one another a housing for a product and are formed by parallel discs which are kept spaced and disposed at right angles with respect to the rotary shaft, a second conveyor comprising a plurality of conveyor receptacles articulated on a support borne by an endless chain and maintained in a conveyor position by a locking system;

this second conveyor, extending over its largest length as an extension of the first conveyor, having an initial transfer zone in which the conveyors are disposed side by side and parallel to one another, these conveyor receptacles having an upper surface of a general concave shape adapted to provide support for a fruit and comprising a central bar extending transversally with respect to the endless chain, and a plurality of fingers disposed at right angles on either side of the central bar, these fingers being distributed such that the discs of the rollers may be interposed between these latter, this second conveyor being disposed at a distance from the first conveyor and the conveyor receptacles being distributed along this second conveyor such that:

in the transfer zone, each receptacle is adapted to be interposed between two rollers, the fingers of each receptacle and the discs of the rollers being adapted to overlap with one another, each conveyor receptacle supports a product initially housed between two rollers after retraction of these rollers on their return towards the loading zone, means for triggering the locking system for the receptacles, adapted selectively to cause the tilting of the receptacles in order to unload the products borne thereby into the unloading zones.

According to the invention, the transfer of the fruit between the first and second conveyors takes place without any risk of bruising of this fruit. The conveyor receptacles are adapted to be interposed between the rollers at the transfer zone and replace these rollers in order to support the fruit, after these rollers have been retracted on their return towards the loading zone.

According to a further characteristic feature of the invention, the first conveyor extends, at the loading zone, along an inclined ramp and comprises a rolling surface for the rollers adapted to cause these rollers to rotate about their axis.

The rollers are thus caused to rotate at the unloading zone, either by simple friction on the rolling surface, or mechanically using a rolling surface, such as a belt, which is caused to pass by. In a known manner, a rotation of this type is intended to ensure that the fruit are appropriately distributed between the rollers.

Moreover, according to a further characteristic feature of the invention, the first conveyor has a horizontal path section upstream of the transfer zone, provided with means for analysing the external appearance of the products, which conveyor comprises, at this analysis zone, a rolling surface for the rollers adapted to cause these rollers to rotate about their axis.

In addition, according to a further characteristic feature of the invention, the conveyor device comprises a third intermediate conveyor, for weighing, interposed along the path of the second conveyor, this weighing conveyor comprising:

a plurality of carriages mounted transversally on an endless chain and free to oscillate vertically, comprising spaced vertical support plates defining an upper support surface of a general concave shape and having a central channel, each of these carriages being adapted to house a conveyor receptacle in a position in which the central bar of this receptacle extends into the channels of the plates and in which the fingers extend between these plates and temporarily to provide support for the products, weighing means comprising a sliding surface for the carriages provided with weighing zones for these carriages.

This third conveyor makes it possible to carry out a weight calibration of the products by means of carriages which temporarily replace the conveyor receptacles in order to support the products and which are retracted once weighing has taken place, the transfers again being carried out without the product being subject to any impacts.

Moreover, according to a preferred embodiment, the vertical plates of the carriages comprise slots provided to face one another towards their front and rear ends and defining two transverse grooves, each of these carriages being:

associated with a transverse shaft, called a traction shaft, of a diameter smaller than the height of the slots, made rigid with the endless chain towards one of its ends and extending within the front groove, this shaft being connected to the rear end of the carriages by means of two lateral connecting rods, adapted such that the rear groove of a carriage houses the transverse traction shaft of the following carriage.

Moreover, according to a further characteristic feature of the invention, the conveyor device comprises an endless conveyor belt disposed laterally on the side of the second conveyor, in the unloading zone, in order, on the one hand, to receive the unloaded products and transfer them to storage zones and, on the other hand, to deaden the fall from the end of the conveyor receptacles, this belt comprising drive means adapted to cause it to move at the same speed as the speed of advance of the second conveyor.

A conveyor belt of this type, in addition to the fact that it deadens the fall from the conveyor receptacles, is intended to prevent the fruits from being bruised when they are unloaded.

Moreover, in order further to decrease the risk of bruising of the fruit, the device advantageously comprises brush rollers driven to rotate about parallel horizontal shafts in the direction of forward movement of the conveyors, these brush rollers being interposed between the conveyor belt and the storage zones. Brush rollers of this type have the effect of braking the speed of the fruit entering the storage zones.

Moreover, the second conveyor advantageously comprises two conveyor lines composed of conveyor receptacles disposed on either side of a single endless chain, the first conveyor also comprising two conveyor lines each provided with a plurality of rollers borne by an endless chain and each adapted to cooperate with one of the conveyor lines of the second conveyor.

Moreover, the first conveyor then advantageously comprises, at the loading zone, a central separation member disposed between the rollers of each conveyor line in order to guide the products to one or other line.

According to a further characteristic feature of the invention, the first conveyor comprises a toothed wheel at its downstream end and the second conveyor comprises a toothed wheel at its upstream end, mounted on the same transverse rotary shaft.

Moreover, in an advantageous manner, in order to prevent fruit from falling during transfer as a result of any malfunction of the locking means of a conveyor receptacle:

the device comprises an intermediate disc mounted on the transverse rotary shaft between the toothed wheels of the first and second conveyors in order possibly to support the conveyor receptacles, the second conveyor comprises a possible support slideway for the end of the conveyor receptacles, extending laterally with respect to the second conveyor between the transfer zone and the first unloading zone.

In the case in which a conveyor receptacle is not locked, it is therefore supported up to the first unloading zone, thereby preventing the fruit from falling.

Moreover, according to a further characteristic feature of the invention, the locking system comprises a catch comprising a hook articulated on the support and adapted to cooperate with a locking spindle mounted on the conveyor receptacle and resilient means for urging the hook towards its locking position, the hook and spindle being disposed to cooperate, after tilting of the conveyor receptacle, under the effect of a reverse tilting obtained by gravity during the return of the conveyor receptacle to the transfer zone.

The locking arms are thus automatically locked as a result of their weight during the return course towards the transfer zone. In order to ensure this locking, however, the device preferably comprises a support member disposed on the return path of the conveyor receptacles towards the transfer zone, and adapted to come into contact at the top with these conveyor receptacles disposed in the inverted position.

DESCRIPTION OF THE DRAWINGS

Further characteristic features, objects and advantages of the invention will be set out in the following detailed description made with reference to the accompanying drawings which show, by way of non-limiting example, a preferred embodiment. In these drawings, which are an integral part of the present description.

DESCRIPTION OF PREFERRED EMBODIMENTS

The conveyor device shown in the drawings is adapted to sort products such as fruit or vegetables as a function of predetermined selection criteria such as the weight and external appearance of these fruit or vegetables.

This device is divided chiefly into a loading zone for fruit, supplied, for instance, in bulk in a water current, an optical analysis zone, a transfer zone, a weighing zone and an unloading zone.

In the loading and optical analysis zones, the fruit is conveyed by a first conveyor, then transferred to a second conveyor in the transfer zone, this second conveyor transporting the fruit to the unloading zone. In addition, a third intermediate conveyor, interposed in the path of the second conveyor, temporarily takes the fruit up in order to weigh it. Moreover, each of these conveyors comprises two conveyor lines.

In the first instance, the first conveyor comprises two separate and identical conveyor lines, distributed symmetrically on either side of a longitudinal plane of symmetry.

Figure 1:
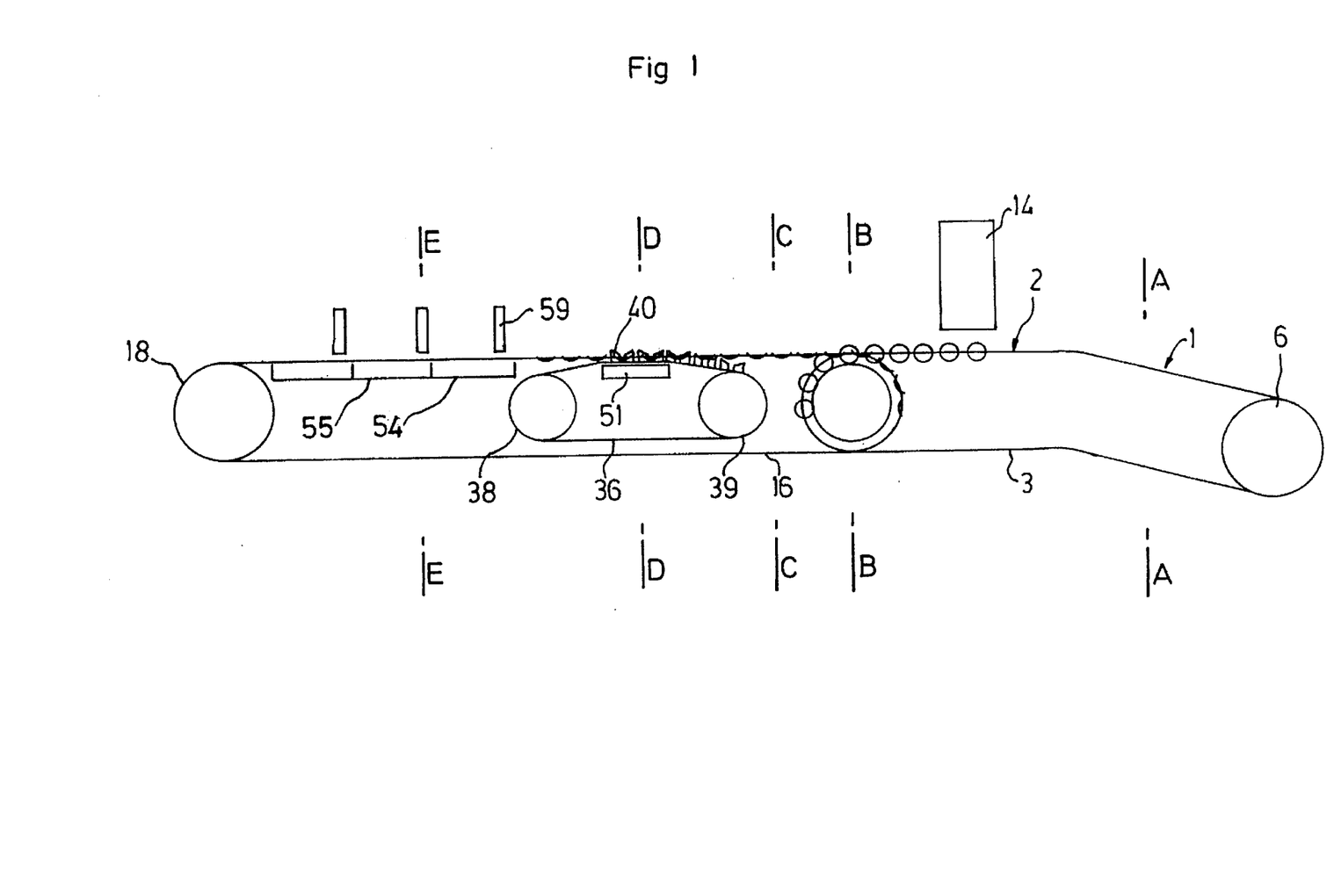
FIG. 1 ms a longitudinal diagrammatic view of a device of the invention.

Each of these conveyor lines comprises a loading zone, extending along an inclined ramp 1 and an optical analysis zone 2 disposed on a horizontal path section.

Each conveyor line comprises an endless chain 3 supported by a profiled section 4 and geared about two toothed wheels 5, 6.

These conveyor lines are provided with a plurality of rollers such as 7, adapted in pairs to define housings for the fruit, mounted freely to rotate about a rotary shaft 8 rigid with the endless chain and extending transversally with respect thereto.

Figure 2:
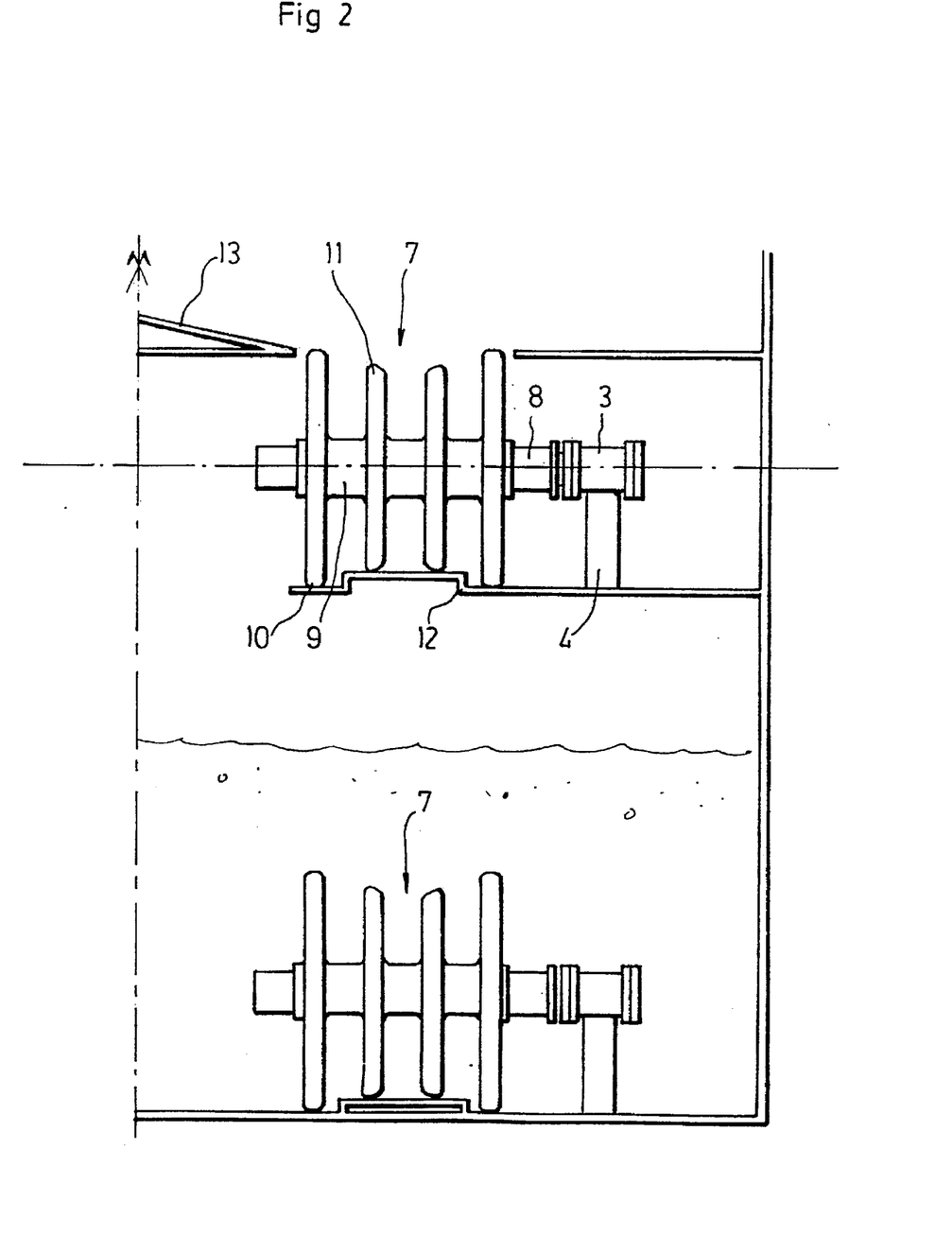
FIG. 2 is a transverse half-section through a vertical plane A.
Figure 3:
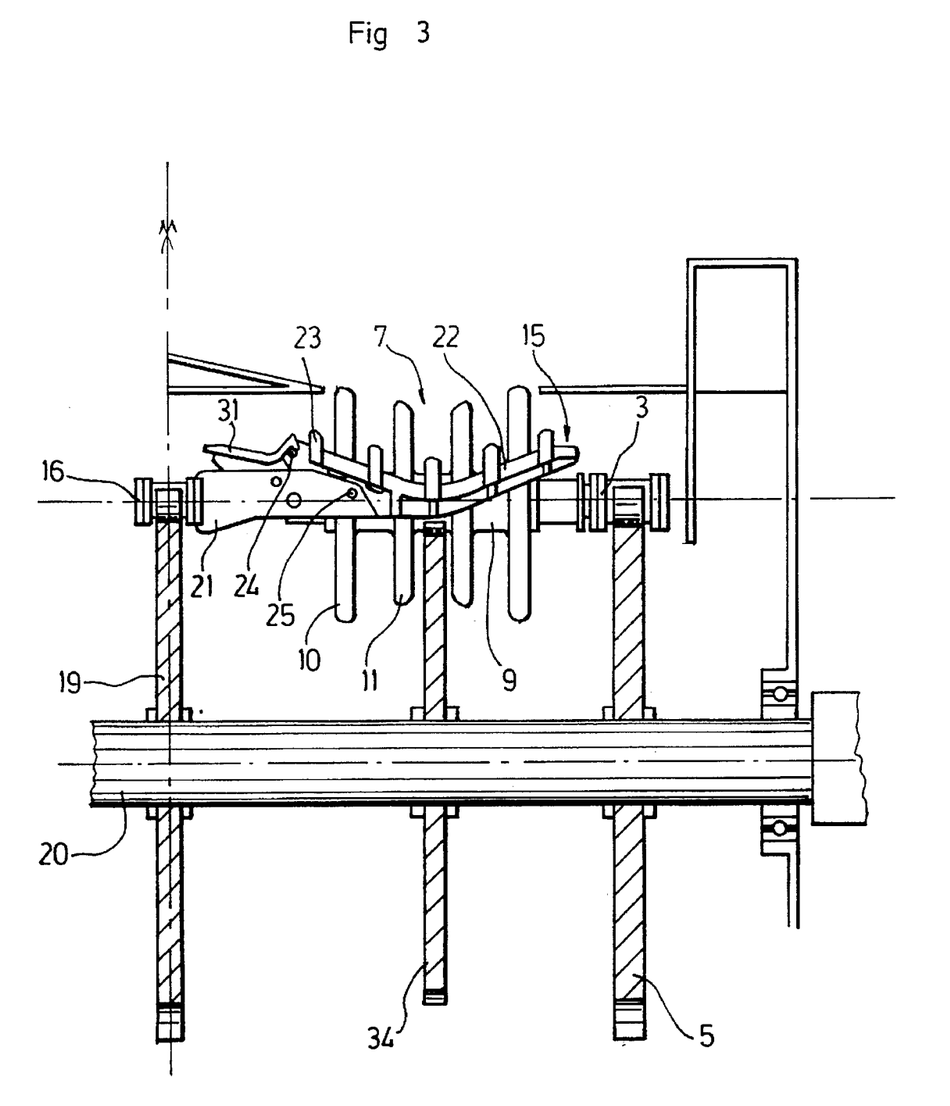
FIG. 3 is a transverse half-section through a vertical plane B.
Figure 4:
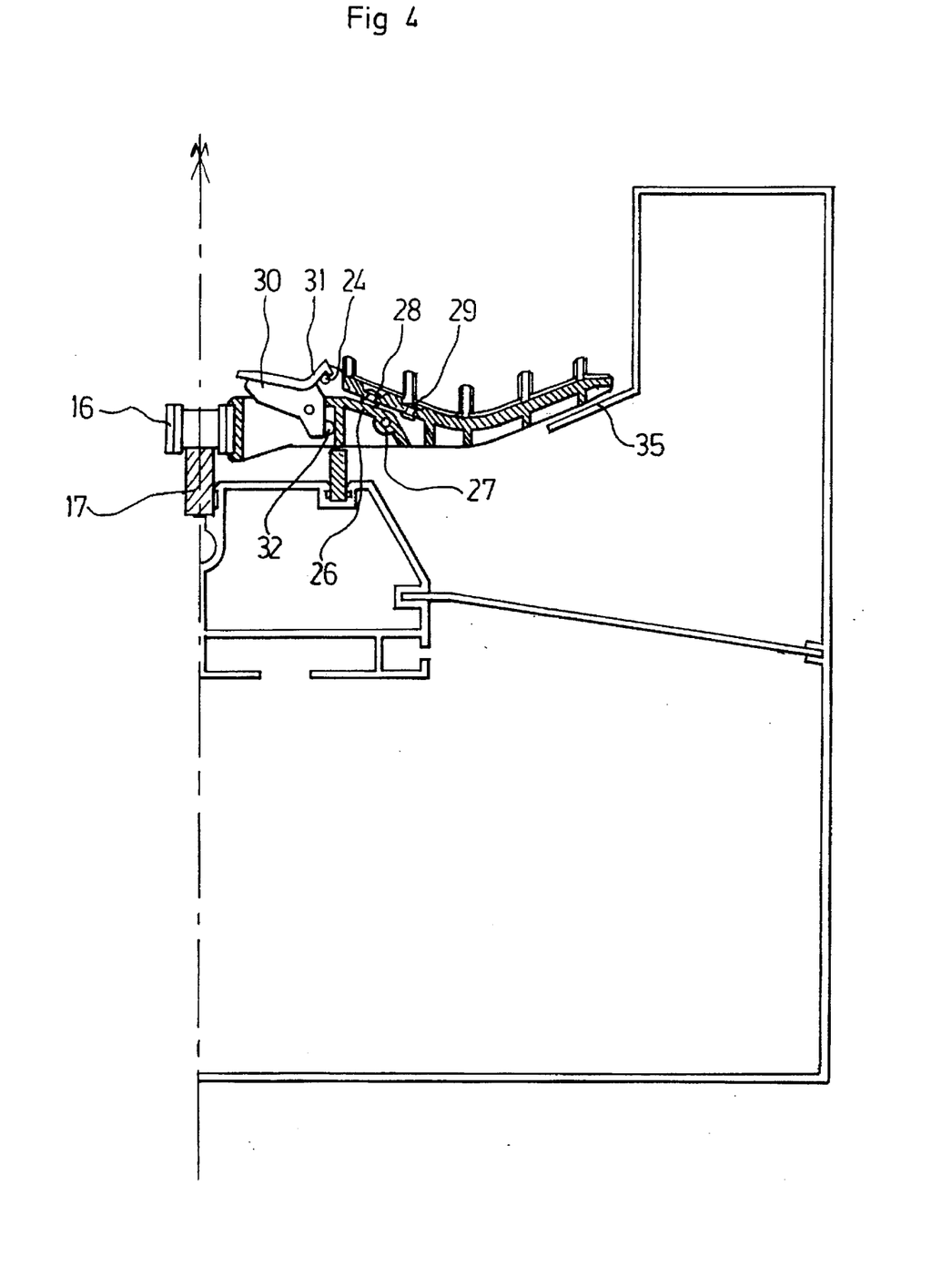
FIG. 4 is a transverse half-section through a vertical plane C.
Figure 5:
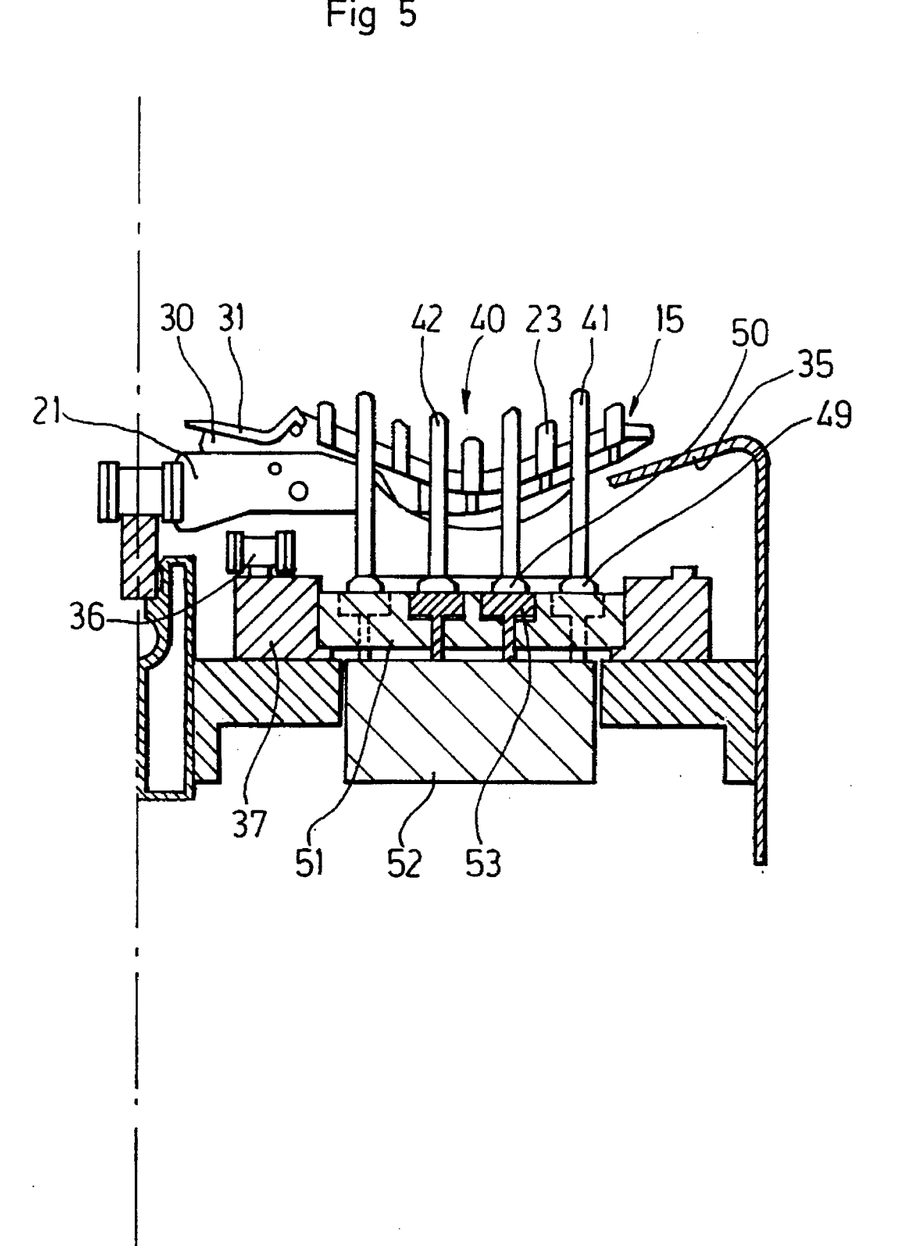
FIG. 5 is a transverse half-section through a vertical plane D.

Each of the rollers 7 comprises a central sleeve 9 mounted on the rotary shaft 8 and spaced vertical discs such as 10, 11 extending radially about the central sleeve 9. These disks 10, 11 also have different diameters adapted such that each roller 7 has a concave biconical outer shape.

In the example, there are four disks: two lateral disks such as 10 of the same diameter and two central disks such as 11 of the same diameter, which is smaller than that of the lateral disks. Moreover, the edges of these disks 10, 11 are machined so as to define a support surface of concave shape.

In addition, each conveyor line of the first conveyor comprises, at the loading zone 1, a rolling surface 12, fixed as shown in the drawings or mobile such as a belt, adapted to cause the rollers 7 to rotate about their axis of rotation.

The first conveyor also comprises a central separation member 13 of a general triangular shape, disposed longitudinally between the respective rollers 7 of the two conveyor lines and adapted to guide the fruit to one or other of the conveyor lines.

Lastly, the first conveyor conventionally comprises, in the optical analysis zone 2, means for driving the rollers 7 in rotation (not shown) such as a rolling surface, a belt, etc., adapted to cause these rollers to rotate plumb with the optical analysis means 14 of any known type such as a camera, etc.

The second conveyor comprises two conveyor lines each provided with conveyor receptacles 15 disposed transversally on either side of a single endless chain 16 supported by a profiled section 17 extending in the plane of longitudinal symmetry of the conveyor device.

The endless chain 16 is geared about two toothed wheels 18, 19: a toothed wheel 18 disposed at the downstream end of the conveyor device and a toothed wheel 19 disposed on the shaft 20 driving the downstream toothed wheels 5 of the first conveyor in rotation. Each conveyor receptacle 15 is articulated on a support 21 made rigid with the endless chain 16, the support and conveyor receptacle being provided with locking means adapted to maintain each receptacle in a conveyor position where it is able to carry a fruit, and to allow the pivoting of this receptacle towards a fruit unloading position.

In the first instance, each conveyor receptacle 15 comprises a transverse central bar 22 of concave shape, on either side of which there extend at right angles a plurality of fingers such as 23 disposing facing one another and curved upwards, so as to provide this receptacle with the shape of an elongate bowl in a transverse direction with respect to the endless chain 16 and adapted to house a fruit.

Figure 7:
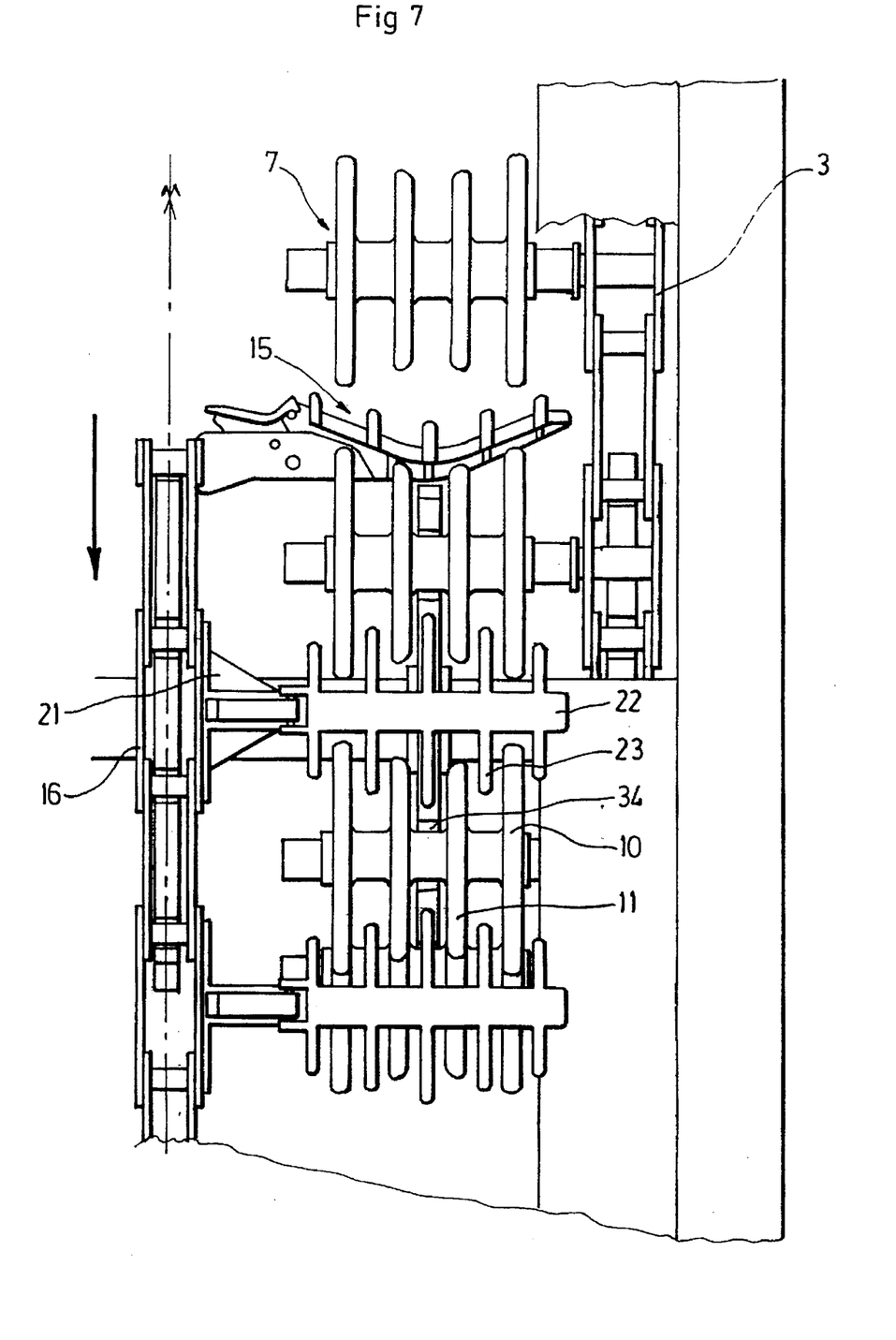
FIG. 7 is a partial top half-view of this device perpendicular to the transfer zone.

Moreover, each conveyor receptacle 15 is disposed such that it can be interposed between two rollers 7 perpendicular to the transfer zone, the fingers 23, five in this example, being adapted to frame the disks 10, 11 of the rollers.

Moreover, the central bar 22 has a cross-section in the shape of an upturned U whose two flanges extend the web at the end for fastening on the support 21, in order to form a yoke housing a horizontal locking spindle 24. Moreover, the two flanges of this U are drilled, at a distance from this end, with two facing holes in order to house the axis 25 of articulation of the conveyor receptacle 15 on the support 21.

This support 21 has, seen from above, the shape of a T each flange of which is rigid with the endless chain 16. The arm of this T has an end 26 longitudinally comprising a portion in the shape of an upturned V, supporting the end of the central bar 22 in its two respective conveyor and unloading positions. This end 26 of the support 21 is adapted so that it can be capped by the transverse bar 22 and comprises a sleeve 27 adapted to house the articulation axis 25.

Moreover, the central bar 22 is provided with two holes provided in the web of this bar and each adapted to house a shoe 28, 29 for support on the end 26 of the support 21 in the two respective conveyor and unloading positions of the conveyor receptacle.

The locking means comprise a catch system comprising a pivoting member 30 articulated on the support 21 and provided with a hook 31 adapted to cooperate with the locking spindle 24 of the conveyor receptacle. Moreover, this catch system comprises a pad 32 of elastomer material borne by the support and adapted to urge the pivoting member 30 into its locking position.

Figure 6:
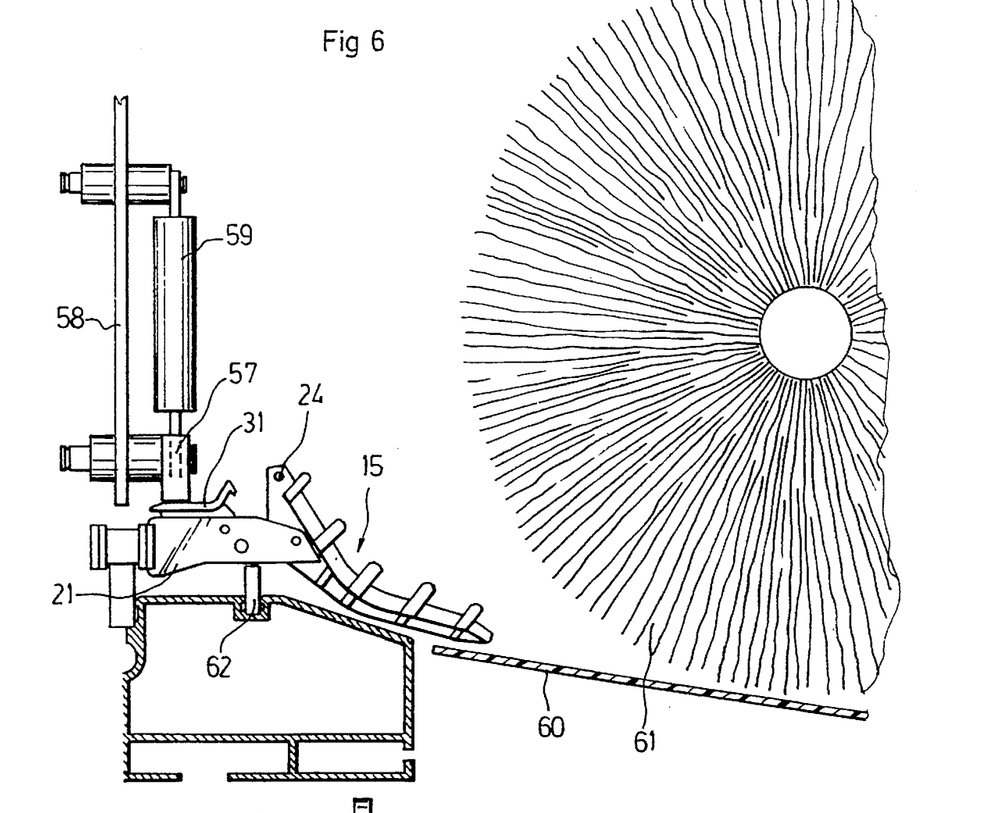
FIG. 6 is a transverse half-section through a vertical plane E.

The locking means comprise, for each conveyor line of the second conveyor, a support member 33 (shown in FIG. 6), formed by a vertical disk interposed on the return path of the conveyor and adapted to come into tangential contact with each conveyor receptacle 15, disposed in its inverted position, so as to lock the latter.

The second conveyor also comprises safety members adapted to prevent the tilting of each conveyor receptacle between the transfer zone and the unloading zone in the case of malfunction of the locking means.

These safety members comprise, in the first instance, for each conveyor line, a disk 34 borne by the rotary shaft 20 between the toothed wheels 5, 19 of the first and second conveyors, this disk being adapted to come into tangential contact below each conveyor receptacle 15 and having a section provided with slots for the passage of the rollers 7.

These safety means also comprise a possible lateral support slideway 35 for the end of the conveyor receptacles, extending longitudinally between the transfer zone and the unloading zone.

The third conveyor, disposed between the transfer zone and the unloading zone, comprises two conveyor lines each interposed on the path of a conveyor line of the second conveyor.

Each of these conveyor lines comprises an endless chain 36 mounted on a profiled section 37 and geared about two toothed wheels 38, 39.

Figure 10A:
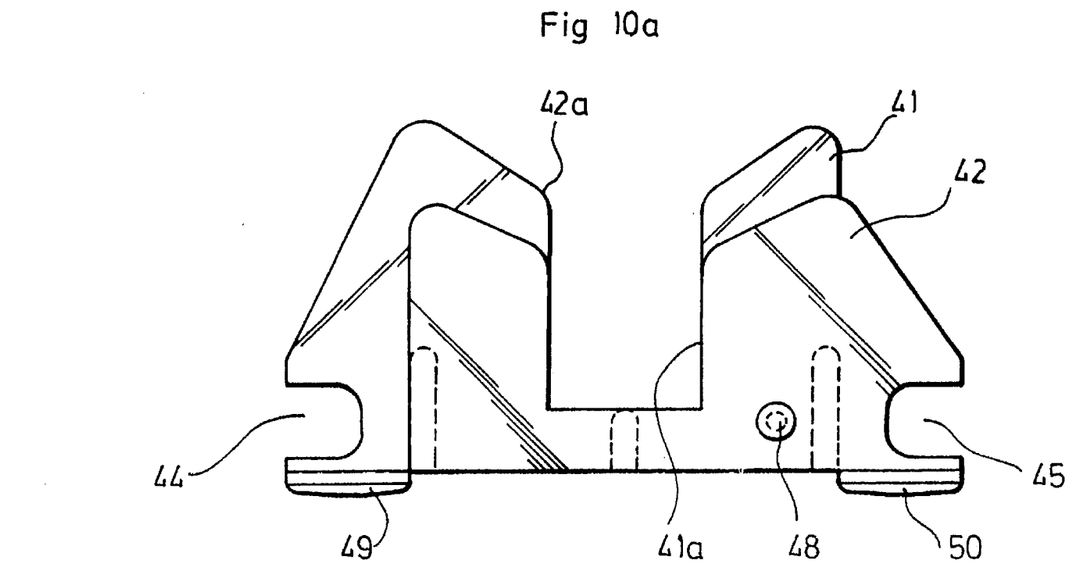
FIG. 10a is a lateral view of a weighing carriage of the invention.

Each conveyor line is provided with carriages 40 comprising spaced vertical support plates such as 41, 42, connected at their lower end by struts 43 and having different heights such that these carriages are provided transversally with an upper support surface of concave shape.

Moreover, each of these plates 41, 42, comprises a central channel 41a, 42a, and has an upper section extending upwards, on either side of this channel, in order to form an upper support surface for the fruit having the shape of a bowl.

In the example, there are four such plates: two lateral plates such as 41 of the same height and two central plates such as 42 of the same height, which is smaller than that of the central plates 42, these lateral 41 and central 42 plates being longitudinally offset and each provided with a slot 44, 45 provided at right angles to their rear end (central plates) and front end (lateral plates) respectively, and forming two transverse grooves.

The support means for these carriages 40 comprise, in the first instance, a transverse traction shaft 46 of smaller diameter than the height of the slots 44, 45, made rigid with the endless chain 36 at one of its ends and extending within the front groove.

Figure 10B:
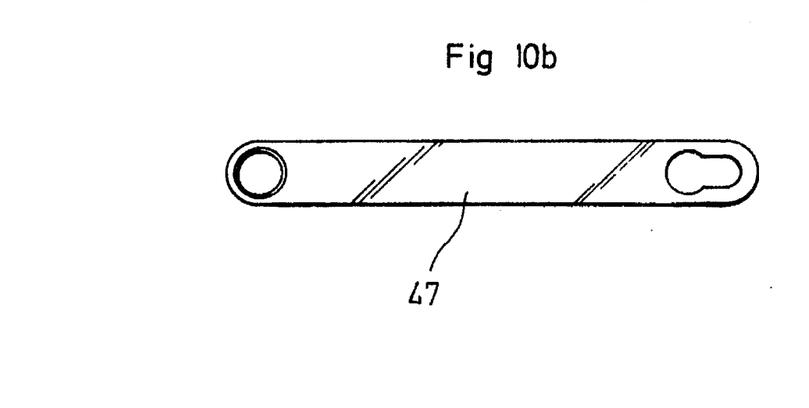
FIG. 10b is a lateral view of a connection rod associated with this carriage.

These support means also comprise two lateral connecting rods such as 47, disposed on either side of the carriage 40 and articulated respectively on the transverse shaft 46 and on a pin 48 projecting with respect to the outer surface of the lateral plates 41, towards the rear end of the latter.

Moreover, the carriages 40 are arranged one behind the other such that the rear groove (slots 45) of a carriage is in alignment with the front groove (slots 44) of the following carriage, the rear zone of the first carriage thus being supported by the traction shaft 46 of the following carriage.

Lastly, each plate 41, 42 is provided with a lower support heel such as 49, 50, disposed towards the front end of the lateral plates 41 and towards the rear end of the central plates 42.

Figure 8:
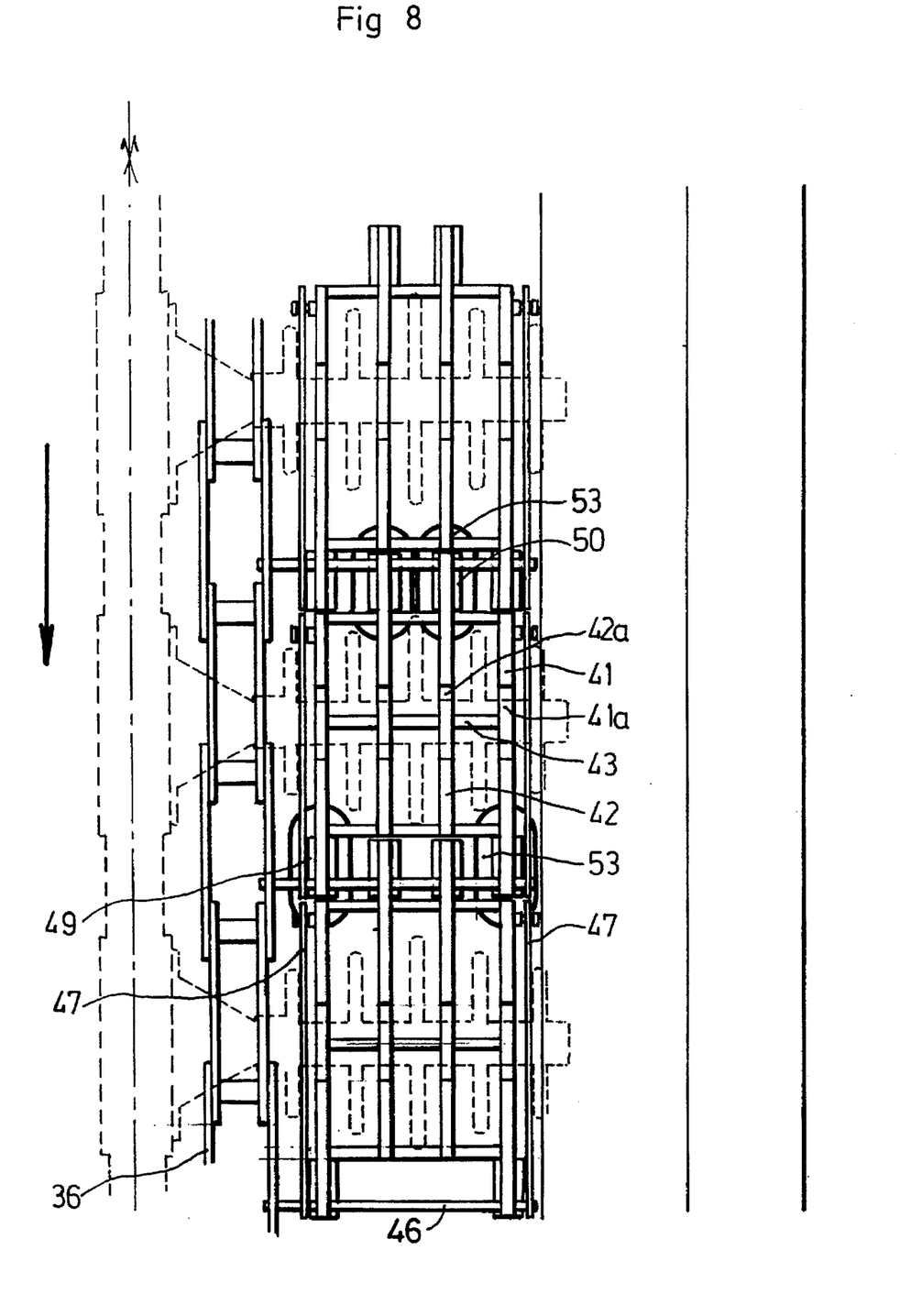
FIG. 8 is a partial top half-view of this device perpendicular to the weighing zone.

Each of these carriages 40 is adapted to house a conveyor receptacle 15, the central bar 22 extending into the channels 41a, 42a, and the fingers 23 being disposed on either side of the plates 41, 42. Moreover, the height of the plates 41, 42 is adapted such that the fruit is borne by the carriage 40 and not by the conveyor receptacle 15 when the carriage and receptacle are meshed with one another.

The third conveyor lastly comprises conventional weighing means, comprising a slideway 51 provided with an upper sliding surface for the support heels 49, 50 of the carriages, provided with a weighing balance 52 comprising four weighing zones such as 53 adapted such that each is plumb with one of these support heels.

Figure 9:
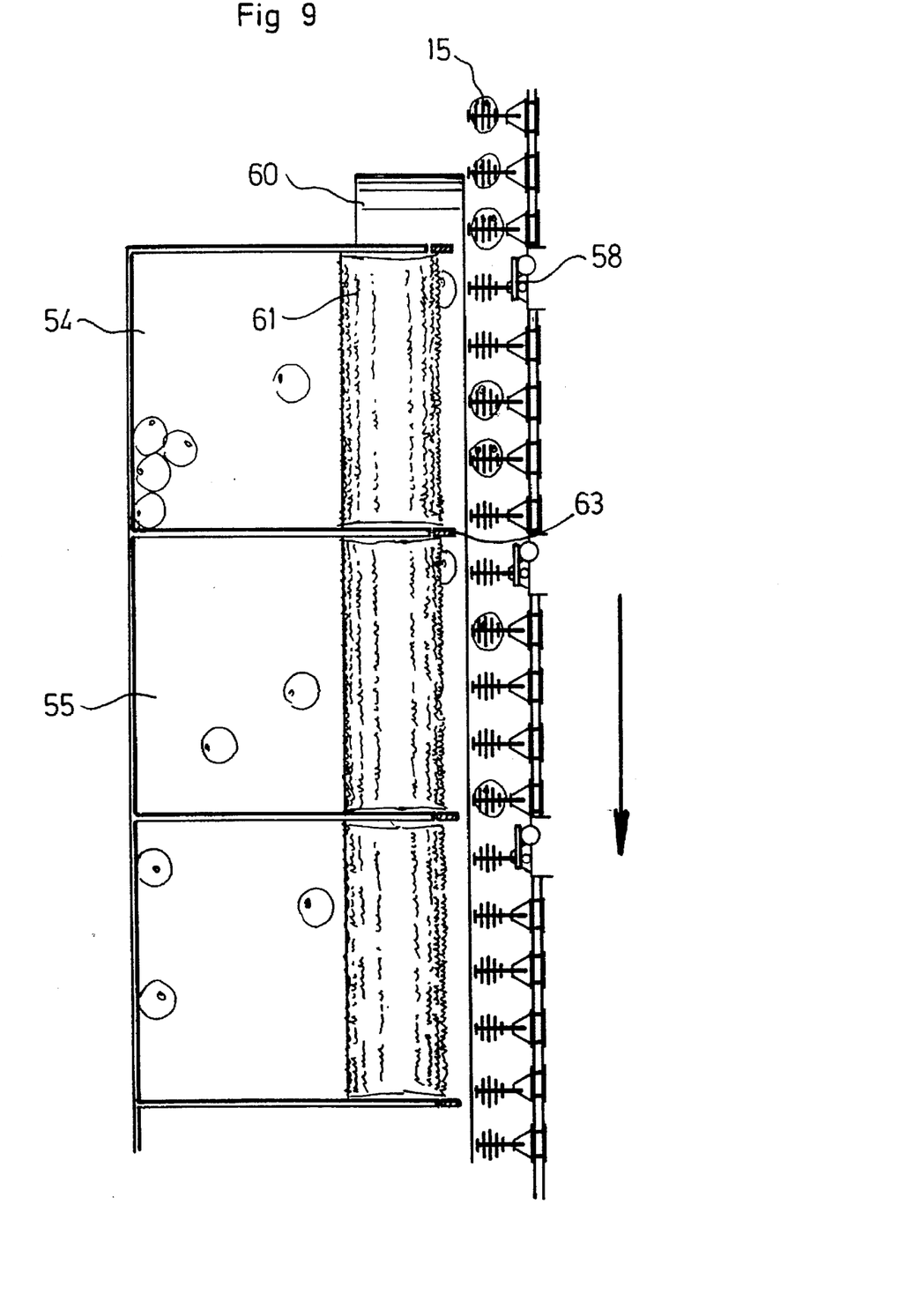
FIG. 9 is a partial top half-view of this device, on a reduced scale, perpendicular to the unloading zone.

The unloading zone towards which the fruit is conveyed, borne by the conveyor receptacles, comprises housings such as 54, 55 disposed one after the other laterally on either side of the conveyor lines.

In addition, means for triggering the locking means are associated with each of these housings. These trigger means comprise a cam 57 provided with an access ramp, an active plane surface and an exit ramp, mounted to pivot about a transverse axis on a fixed vertical plate 58 disposed above the conveyor line in transverse alignment with the beginning of each housing 54, 55. This cam 57 is articulated on the rod of a jack 59 adapted to cause it to pivot between a high position where it allows the pivoting member 30 now locked by the conveyor receptacle 15 to pass freely, and a low position in which it is disposed in the path of this pivoting member and where it causes it to pivot and therefore the descent of the conveyor receptacle 15.

Moreover, at right angles to each cam 57 there is disposed a support shoe 62 disposed below the support 21 of the conveyor receptacles, towards the end thereof, and adapted to prevent any deformation of this support. This shoe 62 also extends longitudinally on either side of each trigger zone in order to stabilise the conveyor lines of the second conveyor when one of these lines is transporting much more fruit than the other.

Figure 11:
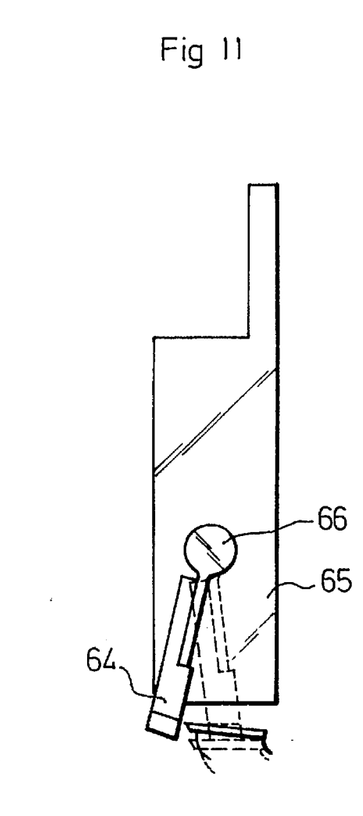
FIG. 11 is a transverse view of a variant of the trigger means, shown in continuous lines in the position in which they do not urge the locking system of the conveyor receptacles and in dotted lines in the position in which they tilt the conveyor receptacles.

FIG. 11 shows a variant of the trigger means in which these latter comprise a cam 64 provided with an access ramp, an active plane surface and an exit ramp, mounted to pivot about a longitudinal axis on a fixed support 59.

This cam is associated with a rotary electromagnet 66 adapted to cause it to pivot between a position (shown in continuous lines in FIG. 11) in which it is laterally offset with respect to the path of the hook 31 and in which it allows the pivoting member 30 to pass freely and a position (shown in dotted lines in FIG. 11) in which it is in the path of the hook 31 and in which it causes it to pivot.

Moreover, the unloading zone is provided, for each conveyor line, with a longitudinal conveyor belt 60 adapted to move at the same speed as each conveyor line and interposed between this line and the housings 54, 55.

This conveyor belt 60 is adapted to deaden the descent of the conveyor receptacles 15 and the fruit.

Moreover, each housing is provided with a brush roller 61 intended to brake the fruit, mounted to rotate about a horizontal longitudinal axis and disposed parallel to the conveyor belt 60.

A shutter with a horizontal axis, shown diagrammatically at 63, is lastly disposed above the conveyor belt 60, as an extension of each separation partition between the housings 54, 55. This shutter 63 adapted to be raised when a fruit is present on the conveyor belt 60 at right angles to a separation partition, which presence shows that the previous housing is full, is adapted to form a detection member adapted to control an emergency shutdown.

I claim:

1. A device for conveying products, in particular fruit, and for sorting these products as a function of predetermined selection criteria, comprising in combination:

a first conveyor provided with a loading zone (1) for the products and comprising a plurality of rollers (7) mounted freely to rotate about a shaft (8) borne by an endless chain (3) and extending at right angles with respect to the latter, said rollers being spaced such that two successive rollers (7) define between one another a housing for a product, and said rollers being formed by spaced parallel disks (10, 11) disposed at right angles with respect to said shaft (8), a second conveyor comprising a plurality of conveyor receptacles (15) articulated on a support (21) borne by an endless chain (16) and maintained in a conveyor position by a locking system (24, 30, 31);

said second conveyor, extending over its largest length as an extension of the first conveyor, having an initial transfer zone in which the conveyors are disposed side by side and parallel to one another, said conveyor receptacles having an upper surface of a general concave shape adapted to provide support for a fruit and comprising a central bar (22) extending transversely with respect to the endless chain (16), and a plurality of fingers (23) disposed at right angles on either side of the central bar (22), said fingers being distributed such that the disks (10, 11) of the rollers (7) may be interposed between these latter, said second conveyor being disposed at a distance from the first conveyor and said conveyor receptacles (15) being distributed along said second conveyor such that:

in the transfer zone, each receptacle (15) is adapted to be interposed between two rollers (7), the fingers (23) of each receptacle and the disks (10, 11) of the rollers being adapted to overlap with one another, each conveyor receptacle (15) supports a product initially housed between two rollers (7) after retraction of said rollers on their return towards the loading zone (1), means (57, 59; 64, 66) for triggering the locking system (24, 30, 31) for the receptacles (15), for selectively causing the tilting of said receptacles in order to unload the products borne thereby into the unloading zones (54, 55).

2. A conveyor device as claimed in claim 1, and including a third intermediate conveyor, for weighing, interposed on the path of the second conveyor, said weighing conveyor comprising:

a plurality of carriages (40) mounted transversely on an endless chain (36) and free to oscillate vertically, comprising spaced vertical support plates (41, 42) defining an upper support surface of general concave shape and having a central channel (41a, 42a), each of these carriages being adapted to house a conveyor receptacle (15) in a position in which the central bar (22) of said receptacle extends into the channels (41a, 42a) of the plates (41, 42) and in which the fingers (23) extend between these plates, and temporarily to provide support for the products, weighing means comprising a sliding surface (51) for the carriages (40) provided with weighing zones (53) for said carriages.

3. A conveyor device as claimed in claim 1, wherein said second conveyor comprises two conveyor lines including conveyor receptacles (15) disposed on either 35 side of a single endless chain (16), said first conveyor also including two conveyor lines each provided with a plurality of rollers (7) borne by an endless chain (3), and each adapted to cooperate with one of the conveyor lines of the second conveyor.

4. A conveyor device as claimed in claim 3, wherein said first conveyor comprises, at the loading zone (1), a central separation member (13) disposed between the rollers (7) of each conveyor line for guiding the products towards one or other conveyor line.

5. A conveyor device as claimed in claim 1, wherein the disks (10, 11) of each roller (7) have different diameters adapted to provide said roller with a concave biconical outer shape.

6. A conveyor device as claimed in claim 1, wherein said first conveyor extends, at the loading zone (1), along an inclined ramp, and comprises a surface (12) for the rolling of the rollers (7) for causing said rollers to rotate about their axis (8).

7. A conveyor device as claimed in claim 1, wherein the first conveyor has a horizontal path section (2) upstream of the transfer zone, provided with means (14) for analysing the external appearance of the products, said first conveyor comprising, at this analysis zone, a rolling surface for the rollers (7) adapted to cause these rollers to rotate about their axis.

8. A conveyor device as claimed in claim 1, wherein the first conveyor comprises a toothed wheel (5) at its downstream end and the second conveyor comprises a toothed wheel (19) at its upstream end, mounted on the same transverse rotary shaft (20).

9. A conveyor device as claimed in claim 8, and including an intermediate disk (34) mounted on said transverse rotary shaft (20) between the toothed wheels (5, 19) of the first and second conveyors for supporting said conveyor receptacles (15).

10. A conveyor device as claimed in claim 1, wherein the second conveyor comprises a support slideway (35) for the end of the conveyor receptacles (15), extending laterally with respect to the second conveyor between the transfer zone and the first unloading zone.

11. A conveyor device as claimed in claim 1, wherein the locking system comprises a catch comprising a hook (31) articulated on the support (21) and adapted to cooperate with a locking spindle (24) mounted on the conveyor receptacle (15) and resilient means (32) for urging the hook (31) into its locking position, the hook and spindle being disposed so as to cooperate, after tilting of the conveyor receptacle (15), under the effect of a reverse tilting obtained by gravity during the return of this conveyor receptacle to the transfer zone.

12. A conveyor device as claimed in claim 11, wherein the trigger means comprise a cam (57; 64) associated with pivoting means (59; 66) and for causing the pivoting of the hooks (31) in a selective manner.

13. A conveyor device as claimed in claim 1, and comprising a support member (62) for supporting the lower end of the supports (21) of the conveyor receptacles (15) at right angles to the trigger means (57, 59; 64, 66).

14. A conveyor device as claimed in claim 1, and comprising a support member (33) disposed 35 on the return path of the conveyor receptacles (15) to the transfer zone and for contacting at the top with said conveyor receptacles disposed in the inverted position for ensuring the locking thereof.

15. A conveyor device as claimed in claim 1, and including an endless conveyor belt (60) disposed laterally on the side of the second conveyor, in the unloading zone, for receiving the unloaded products and transferring them to storage zones (54, 55) and for deadening the descent of the end of the conveyor receptacles (15), said belt comprising drive means for moving said belt substantially at the same speed as the speed of advance of the second conveyor.

16. A conveyor device as claimed in claim 15, and including brush rollers (61) driven to rotate about parallel horizontal axes in the direction of forward movement of the conveyors, said brush rollers being interposed between the conveyor belt (60) and the storage zones (54, 55).

17. A conveyor device as claimed in claim 16, wherein the storage zones are formed by separate housings (54, 55) each having an associated trigger means, a member (63) for detecting the products being disposed above the conveyor belt (60) at right angles to the separation between two housings (54, 55) for controlling a shutdown of the conveyors when a fruit is detected on this conveyor belt.

18. A conveyor device as claimed in claim 2, wherein the vertical plates (41, 42) of the carriages comprise slots (44, 45) facing one another towards their front and rear ends and defining two transverse grooves, each of the carriages being:

associated with a transverse shaft (46), called a traction shaft having a diameter smaller than the height of the slots (44, 45) and rigid with the endless chain (36) towards one of its ends and extending within the front groove, said shaft being connected to the rear end of the carriages (40) by means of two lateral connecting rods (47), and adapted such that the rear groove of a carriage (40) houses the transverse traction shaft (46) of the following carriage.

* * * * *